United States Patent
Cerf et al.

(10) Patent No.: US 7,135,539 B2
(45) Date of Patent: Nov. 14, 2006

(54) NOVOLAC RESINS, PROCESS FOR PREPARING THEM AND USES THEREOF

(75) Inventors: Martine Cerf, Breuil Magne (FR); Stéphane Fouquay, Mont Saint Aignan (FR); Isabelle Silberzan, Paris (FR); Bonnie Stuck, Uniontown, OH (US); Jean-Jacques Troslard, Compiegne (FR)

(73) Assignee: Schenectady International Inc., Schenectady, NY (US)

( * ) Notice: Subject to any disclaimer, the term of this patent is extended or adjusted under 35 U.S.C. 154(b) by 57 days.

(21) Appl. No.: 10/383,221

(22) Filed: Mar. 7, 2003

(65) Prior Publication Data

US 2004/0059039 A1    Mar. 25, 2004

Related U.S. Application Data

(63) Continuation of application No. PCT/FR01/02791, filed on Sep. 7, 2001.

(51) Int. Cl.
C08G 16/04 (2006.01)
C08G 4/00 (2006.01)

(52) U.S. Cl. .................. 528/232; 528/137; 528/159; 528/219

(58) Field of Classification Search ............ 528/232, 528/230, 97, 129, 137, 153, 159, 219; 524/493, 524/492
See application file for complete search history.

(56) References Cited

U.S. PATENT DOCUMENTS

| 3,538,052 A | * | 11/1970 | Higginbottom | 525/502 |
| 3,969,321 A | | 7/1976 | Kako et al. | |
| 4,889,891 A | * | 12/1989 | Durairaj et al. | 525/139 |
| 4,959,292 A | * | 9/1990 | Blakeney et al. | 430/165 |
| 5,030,692 A | | 7/1991 | Durairaj | |
| 5,159,010 A | | 10/1992 | Mori et al. | |
| 5,237,037 A | * | 8/1993 | Ebersole | 528/153 |
| 5,412,058 A | | 5/1995 | Dreyfus et al. | |
| 5,426,152 A | * | 6/1995 | Hesse et al. | 525/139 |
| 5,709,977 A | * | 1/1998 | Tan et al. | 430/192 |
| 6,120,911 A | * | 9/2000 | Beers et al. | 428/457 |
| 6,265,490 B1 | * | 7/2001 | Morel-Fourrier et al. | 525/149 |

FOREIGN PATENT DOCUMENTS

| EP | 0 419 741 A1 | 4/1991 |
| EP | 0 440 036 A | 7/1991 |
| EP | 0 602 861 A2 | 6/1994 |
| EP | 0 798 324 A | 10/1997 |
| FR | 2 193 046 | 2/1974 |
| FR | 2 223 391 | 10/1974 |
| FR | 2 392 391 | 12/1978 |
| JP | 58 160377 | 9/1983 |
| JP | 62 004720 | 1/1987 |

OTHER PUBLICATIONS

Le Bras, Jean; Piccini, Ivan; Direct Reinforcement of Natural Rubber Latex Mixes, Industrial and Engineering Chemistry, Feb. 1951, pp. 381-386, vol. 43, No. 2.

* cited by examiner

*Primary Examiner*—Tae H. Yoon
(74) *Attorney, Agent, or Firm*—Pillsbury Winthrop Shaw Pitman LLP

(57) ABSTRACT

The present invention relates to novel novolac resins obtained by coupling at least one aromatic compound (A) comprising at least two hydroxyl groups and at least one aldehyde (B) in the presence of an acid catalyst and in the presence of water and/or an organic solvent, followed by a step of alkylating the coupling resin thus obtained with at least one unconjugated diene (C), preferably containing no indene. These novolac resins are advantageously used in vulcanized and crosslinked elastomeric compositions since their viscosity, which is lower than that of the resins of the prior art, allows them to be handled easily. They are also used as adhesion promoters for improving the adhesion of rubber to reinforcing materials such as organic fibres made in particular of rayon, polyesters, polyamides or aramids, and metal cords made of steel, in particular brass steel or galvanized steel.

37 Claims, No Drawings

NOVOLAC RESINS, PROCESS FOR PREPARING THEM AND USES THEREOF

This application claims benefit of priority of and is a continuation application of International Application No. PCT/FR 01/02791, filed Sep. 7 2001, which claims benefit of priority of French Application No. 00.11471, filed on Sep. 8, 2000. These applications are incorporated by reference herein in their entirety.

FIELD OF INVENTION

The invention relates to novolac resins obtained by coupling at least one aromatic compound (A) comprising at least two hydroxyl groups, at least one aldehyde (B) and at least one unconjugated diene (C), as well as to a process for preparing them and to their use for improving adhesion, in particular between rubber and rubber-reinforcing materials. The novolac resins according to the invention have essentially no fumes or hygroscopicity and have good adhesion properties when they are used for vulcanizing rubber and reinforcing materials.

BACKGROUND OF THE INVENTION

With the aim of improving adhesion, it is known practice to incorporate a formaldehyde acceptor into rubber, such as a meta-substituted phenol (for example resorcinol or an m-aminophenol) and a formaldehyde donor capable of producing formaldehyde by heating in the rubber.

The abovementioned m-substituted phenols are highly volatile. Thus, when they are used to improve the adhesion of rubbers, they release harmful fumes at the vulcanization temperature (generally above 110° C.).

In addition, these formaldehyde acceptors are hygroscopic, which entails the formation of efflorescences in the rubber compounds during storage. Such efflorescences give rise to an unequal adhesion between the rubber and the reinforcing material, which compromises the quality of the vulcanized articles.

To solve these problems, it has been proposed to use a "resorcinol resin" as formaldehyde acceptor, obtained by coupling resorcinol with formaldehyde (Industrial Engineering Chemistry, pp. 381–386, (1946)). Although the resin makes it possible to obtain both substantial adhesion and an improvement in the physical properties of the rubber (hardness and modulus), it has a deliquescent state such that it adheres to the wrapping materials or forms a block. It goes without saying that this poses numerous problems during storage or handling. In addition, the resin contains a large amount of free resorcinol ($\geq 15\%$), which does not make it possible to overcome the drawbacks associated with the presence of fumes and caking.

EP-A 419 741 and DE-A-4 001 606 have proposed the use of modified novolacs resulting from co-coupling of a phenol (for example resorcinol), an unsaturated hydrocarbon (for example styrene) and an aldehyde (for example formaldehyde).

Ternary products of co-coupling of a phenol such as resorcinol, an alkylphenol and an aldehyde have also been proposed. For example, in FR 2 193 046, FR 2 223 391, FR 2 392 049 and EP-A-602 861, the said products are obtained by coupling a resol (alkylphenol/formal) with resorcinol in the presence of an acid catalyst.

U.S. Pat. No. 5,030,692 describes the synthesis of a ternary compound by coupling resorcinol with a resol obtained by reacting an alkylphenol and methylformcel or furfural in acid medium.

In the ternary products which have just been mentioned, while the free resorcinol content is undoubtedly low (<5%), it is, however, accompanied by a loss of reactivity with respect to the formaldehyde donor.

JP 62-004 720 discloses novolac resins obtained by coupling an excess of resorcinol and dicyclopentadiene (resorcinol/dicyclopentadiene molar ratio=2.9), the excess resorcinol being removed at the end of the reaction, for example, by distlllation under reduced pressure or fractional precipitation. These resins have improved heat resistance and flexibility properties that are desired in the electronics field.

EP-A-798 324 discloses novolac resins obtained by coupling an aromatic compound with at least two hydroxyl groups such as resorcinol and an unconjugated diene such as dicyclopentadiene in an (aromatic compound)/(diene) molar ratio of between 0.7 and 1.5, in which the free resorcinol content is in the region of 5% and in which the number-average and weight-average molar masses are rather low (usually less than 1000).

U.S. Pat. No. 4,889,891 discloses compositions based on vulcanizable rubber in which are dispersed a novolac resin which is obtained by modification of a substituted phenol or resorcinol with a mono- or polyunsaturated hydrocarbon followed by coupling with a monoaldehyde.

U.S. Pat. No. 3,969,321 discloses a process for the preparation of synthetic resins consisting of the reaction of a dienic compound directly with a phenolic resin, particularly of novolac type, in the presence of a strong acid catalyst. Novolac resins are obtained by reacting an aldehyde and a phenol having a sole hydroxyl group.

U.S. Pat. No. 3,538,052 discloses phenol-aldehyde novolac resins reacting with a specific mixture consisting of indene substituted or not, dicyclopentadiene, codimer of cyclopentadiene et at least of a conjugated non-cyclic diene and a compound having at least a phenyl group substituted or not by one or more vinyl(idene) groups; the authors point out that, in comparison with classical novolac resins, these resins have both improved water-absorption and improved mechanical and electrical properties. They can be used as adhesives or binders for granular materials and can advantageously replace known thermosetting pulverulent resins.

SUMMARY OF THE INVENTION

A subject of the present invention is novolac resins obtained by coupling (A) an aromatic compound comprising at least two hydroxyl groups and (B) an aldehyde and (C) an unconjugated diene, preferably containing no indene, the said resins having a free aromatic compound content of less than 2% by weight, or even less than 1%.

Compared with the resins disclosed in U.S. Pat. No. 4,889,891, the resins according to the invention having the same proportions of monomers (A), (B) and (C) have a lower ring and ball temperature, which turns out to be particularly advantageous for some of the intended applications, and especially during their use in elastomeric resins; furthermore, the resins according to the invention have a lower viscosity, which is also an advantage for handling them (during the actual synthesis and during their various uses, for example as a mixture with other resins).

Another subject of the invention relates to a process for preparing the abovementioned resins, which comprises a step of coupling an aromatic compound (A) comprising at least two hydroxyl groups and an aldehyde (B) in the presence of an acid catalyst, followed by a step of alkylating the coupling resin thus obtained with an unconjugated diene (C).

Compared with the process described in U.S. Pat. No. 4,889,891, the process according to the invention has a more favorable energy balance:

Firstly, the temperature of the reaction mixture increases gradually from room temperature up to a temperature of about 200–220° C. by using the exothermicity of the coupling reaction of (A) and (B) and then of the reaction with (C), whereas, for the process disclosed in U.S. Pat. No. 4,889,891, the temperature of the reaction medium is first increased so as to dissolve (A) and to allow the reaction of (A) and (C) (i.e. 100–150° C.) and is then reduced (60–100° C.) when (B) is reacted, and is finally raised again to distill off the solvent (with an appreciable risk of the reaction medium setting to a solid in the reactor, more particularly for novolac resins whose ring and ball temperatures are higher than the distillation temperature of the solvent used), Secondly, the novolac resin according to the invention is simply transvased at the end of the devolatilization reaction, whereas to transvase the resin according to U.S. Pat. No. 4,889,891, it is necessary to increase the temperature considerably, such that it is at least 50° C. above the ring and ball temperature of the novolac resin.

DETAILED DESCRIPTION OF PREFERRED EMBODIMENTS

The aromatic compound (A) is generally chosen from monoaromatic compounds such as resorcinol, pyrocatechol, hydroquinone, pyrogallol and phoroglucinol, and the polyaromatic compounds of formula:

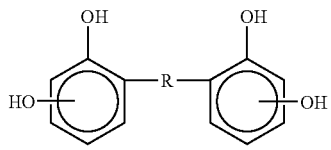

in which R represents an alkylene or arylalkylene radical containing 1 to 12 carbon atoms.

The aromatic compound (A) can comprise one or several of the abovementioned compounds. Resorcinol is preferably used.

The aromatic compound (A) can also comprise up to 25 mol % of at least one other substituted or unsubstituted phenol comprising, for example, alkylphenols whose alkyl radical contains from 1 to 14 carbon atoms, and catechu oil.

The aldehyde (B) comprises formaldehyde, paraformaldehyde, acetaldehyde, propionaldehyde, isobutyraldehyde, n-butyraldehyde, crotonaldehyde, benzaldehyde, furfural and glyoxal, alone or as a mixture. Formaldehyde or formol is preferred.

The [aldehyde]/[aromatic compound] (B)/(A) molar ratio is preferably between 0.05 and 1.

The unconjugated diene (C), that preferably does not contain indene, comprises adducts obtained by Diels-Alder reaction starting with at least two conjugated dienes such as butadiene, isoprene, piperylene, cyclopentadiene and methylcyclopentadiene. Examples of such compounds which may be mentioned are dicyclopentadiene (DCPD), dimethyldicyclopentadiene, dipentene, norbornadiene, oligomers and co-oligomers of the abovementioned conjugated dienes, and mixtures of these compounds.

Unconjugated dienes containing from 8 to 25 carbon atoms are preferably used, and advantageously dienes comprising from 75% to 100% by weight of at least one dimer such as dicyclopentadiene and 0% to 25% by weight of at least one other dimer, co-dimer, trimer or, better still, dienes comprising 75% by weight of dicyclopentadiene and 25% by weight of at least one co-dimer comprising cyclopentadiene-piperylene, cyclopentadiene-isoprene and cyclopentadiene-methylcyclopentadiene.

The unconjugated diene (C) can also comprise up to 25 mol % of at least one compound comprising from aliphatic olefins, for example diisobutylene, isobutylene or amylene, branched olefins comprising a $C_6$–$C_{14}$ alkylaryl, aryl or alkyl radical, for example styrene, α-methylstyrene or vinyltoluene.

The [unconjugated diene]/[aromatic compound] [C]/[A] molar ratio is advantageously between 0.2 and 2 and preferably between 0.8 and 1.8.

The acid catalyst comprises from hydrochloric acid, phosphoric acid, sulphuric acid, acetic acid, alkylsulphonic acid, arylsulphonic acid, alkylarylsulphonic acid, phenolsulphonic acid, alkylphenolsulphonic acid, aryldisulphonic acid and mnixtures thereof, $BF_3$ in gaseous form or in the form of complexes with a phenol and alcohols.

The amount of acid used is generally between 0.010 and 5% by weight relative to the weight of aromatic compound (A).

The coupling of the aromatic compound (A) and the aldehyde (B) in the presence of an acid catalyst is carried out in the presence of water and/or an organic solvent. The preferred solvents are alcohols and in particular methanol, ethanol, isopropanol and butanol, aromatic hydrocarbons such as toluene, xylene, ethylbenzene, cumene or aromatic hydrocarbon fractions with a boiling point of less than 220° C., aliphatic hydrocarbons such as hexane or heptane, and ethers such as tetrahydrofuran.

The amount of solvent is generally from 0.2 to 10 in terms of weight equivalent-relative to the aromatic compound (A), preferably between 0.2 and 5 in terms of weight equivalent relative to (A).

The aldehyde (B) is introduced:
Either at the same time as the aromatic compound (A), preferably into the bottom of the reactor, the catalyst being introduced subsequently at a temperature such that the reaction medium is homogeneous between 20° C. and 100° C., preferably between 50° C. and 80° C., or By adding it after introducing the acid catalyst at a temperature such that the medium is homogeneous, generally between 20° C. and 110° C., preferably between 40° C. and 100° C. The advantage of this second process over the first process is that the exothermicity produced during the introduction of the acid is limited.

The alkylation of the resin obtained from the coupling of the aromatic compound (A) and the aldehyde (B) is carried out by adding the unconjugated diene (C) preferably over a period ranging from 5 minutes to 3 hours at a temperature generally between 100° C. and 160° C. The reaction medium is then maintained at a steady temperature generally of between 130° C. and 150° C.

After the reaction, the novolac resin according to the invention is recovered, optionally after a distillation step, preferably under vacuum, for example between 4 kPa and 12 kPa, and at a temperature of between 180° C. and 230° C., preferably between 200° C. and 220° C. The resin, which is generally dark, violet to black in color, has a ring and ball melting point (measured according to NFT standard 76–106) of between 80° C. and 170° C. and preferably between 110° C. and 160° C., and number-average and weight-average molar masses $M_n$ and $M_w$ preferably of between 800 and 2000 and of between 1000 and 5000, respectively.

Another subject of the invention concerns rubber-based compositions comprising the novolac resins according to the invention defined above. Such compositions comprise from 0.5 to 20 parts by weight, and preferably from 1 to 10 parts by weight, of the said resins per 100 parts by weight of rubber.

The rubber comprises natural rubber and synthetic rubbers, among which mention will be made most particularly of styrene-butadiene copolymers, polybutadiene, butadiene-acrylonitrile copolymers and hydrogenated derivatives thereof, polychloroprene, butyl rubber or halogenated butyl rubber, polyisoprene, ethylene-propylene-diene terpolymers (EPDM), fluoro elastomers and mixtures of at least two of these compounds.

The rubber-based compositions containing the abovementioned resins are vulcanized with sulphur and crosslinked by means of a formaldehyde donor known in the field. Examples which may be mentioned include hexamethoxymethylolmelamine, advantageously adsorbed onto silica, and hexamethylenetetramine. The formol donor is generally used at a rate of from 0.5 to 10 parts by weight, and preferably 1 to 5 parts by weight, per 100 parts by weight of rubber.

The rubber-based compositions containing the abovementioned resins also contain from 3 to 50 parts by weight, and preferably from 5 to 20 parts by weight, of silica per 100 parts by weight of rubber.

The rubber-based compositions containing the abovementioned resins can also contain various additives, in particular (as parts by weight per 100 parts by weight of rubber):

Inorganic reinforcing fillers such as carbon black (20–120 parts), calcium carbonate and black/silica mixtures, Vulcanization accelerators, catalysts and/or retardants, Antioxidants, antiozonants and/or antidegradants for stabilizing the compositions, Peptizers, so-called "process" oils, tackifying resins, lubricants and/or plasticizers for carrying out the compounding, and "Adhesion co-promoters" such as organocobalt salts, complex salts of cobalt and boron, and lead oxides intended to improve adhesion of the rubber to metal cords. In general, from 0.1 to 5 parts are used, calculated on the basis of the cobalt or lead.

The crosslinking and vulcanization conditions depend on the nature of the rubber and the compounding additives. These conditions are not critical in themselves and form part of the general knowledge of a person skilled in the art.

These compositions may be used advantageously for the manufacture of vulcanized tires and conveyor belts.

Another subject of the invention concerns the use of novolac resins defined above as adhesion promoters for imnproving the adhesion of rubber to reinforcing materials such as organic fibers made in particular of rayon, polyesters, polyamides or aramids, and metal cords made of steel, in particular brass steel (whose copper content is generally between 60% and 70% of the total weight of the alloy) or galvanized steel.

Unless otherwise indicated, in the examples which follow, the percentages are percentages on a weight basis.

EXAMPLES 1

164 g of toluene and 330 g of resorcinol are introduced at room temperature into a reactor fitted with a stirrer, a temperature probe and Dean-Stark apparatus equipped with a condenser. The reaction medium is heated to 60° C. 2.2 g of concentrated 92% sulphuric acid are introduced and the reaction medium is then brought to 100° C. It is maintained at this temperature for 15 min with stirring, after which 45 g of formol as a 50% solution in water are added over 15 min. The reaction medium is brought to 110° C. while distilling off the water azeotropically. After stabilization at 110° C. for 15 mn, 476 g of a resin containing 75% of DCPD and 25% of co-ditners sold by the company Dow under the name DCPD RG are introduced over 1 h. The temperature of the reaction medium increases gradually to reach 138° C. at the end of the addition. The reaction medium is maintained at 130–135° C. for 3 h. After neutralization of the reaction medium with 3.6 g of aqueous 85% triethanolataine solution, the condenser is placed in the distillation position and distillation is carried out under a vacuum of 4 kPa while increasing the temperature to 200° C. The system is then maintained under vacuum at this temperature for 1 h. The resin obtained has a ring and ball temperature of 120° C. and a free resorcinol content, measured by HPLC, of 1.2%. By steric exclusion chromatography of the resin dissolved in THF, a spectrum with several peaks is obtained, the main peaks corresponding, as polystyrene equivalent, to:

A main peak representing 63.2% of the total surface area, corresponding to an $M_n$ of 1644 and a polydispersity of 1.2 as polystyrene equivalent, A second peak representing 10% of the total surface area, corresponding to an $M_n$ of 940 and a polydispersity of 0.88, A third peak representing 12% of the total surface area, corresponding to an $M_n$ of 670 and a polydispersity of 0.94.

The average masses of the novolac resin, $M_n=1061$ and $M_w=1858$, are deduced therefrom.

EXAMPLE 2

164 g of toluene, 330 g of resorcinol and 45 g of aqueous 50% formol solution are introduced at room temperature into a reactor fitted with a stirrer, a temperature probe and Dean-Stark apparatus equipped with a condenser. The reaction medium is heated to 60° C., followed by introduction of 2.2 g of concentrated 92% sulphuric acid. The reaction medium is brought to 110° C. while distilling off the water azeotropically. After stabilization at 110° C. for 15 main, 526.4 g of a resin containing 83% of DCPD and 17% of co-dimers sold by the company Shell are introduced over 1 h. The temperature of the reaction medium increases gradually to reach 128° C. at the end of the addition. The reaction medium is maintained at 130–135° C. for 3 h. After neutralization of the reaction medium with 3.6 g of 85% triethanolamine, the condenser is placed in the distillation position and distillation is carried out under a vacuum of 4 kPa while increasing the temperature to 200° C. The system is then maintained under vacuum at this temperature for 1 h. The resin obtained is fluid and has a dark violet color on transvasing. The ring and ball temperature of this resin is 117° C. with a free resorcinol content of 0.65%. By steric exclusion chromatography of the resin dissolved in THF, the following average masses, expressed as polystyrene equivalent, are obtained: $M_n=1024$, $M_w=1737$.

EXAMPLE 3

164 g of toluene, 60 g of water, 40 g of methanol and 330 g of resorcinol are introduced at room temperature into a reactor fitted with a stirrer, a temperature probe and Dean-Stark apparatus equipped with a condenser. The reaction medium is heated to 60° C., followed by introduction of 3.71 g of concentrated 58% sulphuric acid. 50% formol (45 g) is added over 15 nmin to reach 87° C. The reaction medium is brought to 110° C. while distilling off the water azeotropically. After stabilization at 110° C. for 15 min, 526.4 g of a resin containing 83% of DCPD and 17% of co-dirners and sold by the company Shell are introduced over 1 h. The temperature of the reaction medium increases gradually to reach 137° C. at the end of the addition. The reaction medium is maintained at 130–135° C. for 3 h. After neutralizing the reaction medium with 3.6 g of 85% triethanolamine, the condenser is placed in the distillation position and distillation is carried out under a vacuum of 4 kPa while increasing the temperature to 200° C. The system is then maintained under vacuum at this temperature for 1 h. The resin obtained is fluid and has a dark violet color on transvasing. The ring and ball temperature of this resin is 127° C. with a free resorcinol content of 0.85%. By steric exclusion chromatography of the resin dissolved in THF, the following average masses, expressed as polystyrene equivalent, are obtained: $M_n$=1102, $M_w$=2016.

EXAMPLE 4

164 g of toluene, 165 g of water and 330 g of resorcinol are introduced at room temperature into a reactor fitted with a stirrer, a temperature probe and Dean-Stark apparatus equipped with a condenser. The reaction medium is heated to 60° C. 3.71 g of concentrated 58% sulphuric acid are introduced. 50% formol (45 g) is added over 15 nin to reach 92° C. in the reaction medium. The reaction medium is brought to 110° C. while distilling off the water azeotropically. After stabilization at 110° C. for 15 min, 526.4 g of a mixture containing 83% of DCPD and 17% of co-dimers are introduced over 1 h. The temperature of the reaction medium increases gradually to reach 142° C. at the end of the addition. The reaction medium is maintained at 130–135° C. for 3 h. After neutralizing the reaction medium with 3.6 g of 85% triethanolamine, the condenser is placed in the distillation position and distillation is carried out under a vacuum of 4 kPa while increasing the temperature to 200° C. The system is then maintained under vacuum at this temperature for 1 h. The resin obtained is fluid and has a dark violet color on transvasing. The ring and ball temperature of this resin is 130° C. with a free resorcinol content of 1.3%.

EXAMPLE 5

66 g of water and 330 g of resorcinol are introduced at room temperature into a reactor fitted with a stirrer, a temperature probe and Dean-Stark apparatus equipped with a condenser. The reaction medium is heated to 60° C. 3.71 g of aqueous $^{58}$% sulphuric acid solution are introduced. 45 g of aqueous 50% formol solution are then added to the reaction medium over 15 min, causing its temperature to rise from 60° C. to 90° C. The reaction medium is maintained at 90° C. for 30 min, followed by addition of 165 g of toluene. The reaction medium is brought to 110° C. while distilling off the water azeotropically. After stabilization at 110° C. for 15 min, 526.4 g of resin containing 83% of DCPD and 17% of co-dimers are introduced over 45 min. The temperature of the reaction medium increases gradually to reach 142° C. at the end of the addition. The reaction medium is maintained at 140–145° C. for 1 h 30 min. After neutralizing the reaction medium with 3.6 g of a triethanolamine/diethanol mixture consisting of 85% by weight of triethanolamine and 15% of diethanol, the condenser is placed in the distillation position and distillation is carried out under a vacuum of 4 kPa while increasing the temperature to 200° C. The system is then maintained under vacuum at this temperature for 1 h. The resin obtained is fluid and has a dark violet color on transvasing. The ring and ball temperature of this resin is 120° C. with a free resorcinol content of 0.85%. By steric exclusion chromatography of the resin dissolved in THF, the following average masses, expressed as polystyrene equivalent, are obtained: $M_n$=1076, $M_w$=2897.

EXAMPLE 5a (COMPARATIVE ACCORDING TO U.S. Pat. No. 4,889,891)

330 g of resorcinol are introduced, at 20° C., into a reactor fitted with a stirrer, a temperature probe and Dean-Stark apparatus equipped with a condenser. The contents of the reactor are brought to 115° C. 3.71 g of aqueous 58% sulphuric acid solution are introduced with stirring, which is maintained throughout the synthesis. 526.4 g of resin containing 83% of DCPD and 17% of co-dimers are then introduced at slow speed so as to reach and maintain a temperature of 135–140° C. during the addition of the DCPD. 150 g of methanol are added to the reactor, followed by addition over 30 min, at a temperature of between 80° C. and 85° C., of 40.9 g of Elform (55%/35%/10% formol/methanol/water mixture). The reaction medium is then maintained at reflux for 2 h. The solvent is then distilled off under reduced pressure. The resin obtained is fluid and has a violet color. Its ring and ball temperature is 152° C. with a free resorcinol content of 0.9%. Analysis of the resin dissolved in THF by steric exclusion chromatography gives the following masses: $M_n$=1371, $M_w$=3469.

EXAMPLES 6, 6a (COMPARATIVE) AND 7

164 g of toluene, 330 g of resorcinol and a variable amount of 50% formol, as indicated in Table 1 below, are introduced at room temperature into a reactor fitted with a stirrer, a temperature probe and Dean-Stark apparatus equipped with a condenser. The reaction medium is heated to 60° C., followed by introduction of 2.2 g of concentrated 92% sulphuric acid. The reaction medium is brought to 110° C. while distilling off the water azeotropically. After stabilization at 110° C. for 15 min, 526.4 g of a resin containing 75% of DCPD and 25% of co-dimers are introduced over 1 h. The temperature of the reaction medium increases gradually to teach 130–140° C. at the end of the addition, and the reaction medium is maintained at this temperature for 3 h. After neutralizing the reaction medium with 3.6 g of 85% triethanolamine, the condenser is placed in the distillation position and distillation is carried out under a vacuum of 4 kPa while increasing the temperature to 200° C. The system is then maintained under vacuum at this temperature for 1 h. The resin obtained is fluid and has a dark violet color on transvasing. The results of the analyses of these products are given in Table 1 below.

TABLE 1

| Examples | Q | RB | $M_n$ | $M_w$ | Free resorcinol (%) |
|---|---|---|---|---|---|
| 6 | 18 | 108 | 849 | 1365 | 1.9 |
| 6a (comparative) | 0 | 95 | 657 | 933 | 2.2 |
| 7 | 36 | 117 | 948 | 1571 | 1.85 |

Q: quantity of 50% formol used in the reaction (g)
RB: Ring and Ball temperature (° C.)
$M_n$ $M_w$: measured as polystyrene equivalent by steric exclusion chromatography of the resin dissolved in THF EXAMPLES 8 AND 8a (COMPARATIVE)

164 g of toluene, 330 g of resorcinol and a variable amount of aqueous 50% fonnol solution, as indicated in Table 2 below, are introduced at room temperature into a reactor fitted with a stirrer, a temperature probe and Dean-Stark apparatus equipped with a condenser. The reaction medium is heated to 60° C. and 2.2 g of 92% sulphuric acid are introduced. The reaction medium is brought to 110° C. while distilling off the water azeotropically. After stabilization at 110° C. for 15 min, 396.6 g of a mixture containing 75% by weight of DCPD and 25% by weight of co-dimers are introduced over 45 min. The temperature of the reaction medium increases gradually to reach 130–140° C. at the end of the addition. The reaction medium is maintained at 130° C. for 3 h. After neutralizing the reaction medium with 3.6 g of 85% triethanolamine, the condenser is placed in the distillation position and distillation is carried out under a vacuum of 4 kPa while increasing the temperature to 200° C. The system is then maintained under vacuum at this temperature for 1 h. The resin obtained is fluid and has a dark violet color on transvasing. The results of the analyses of these products are collated in Table 2 below.

TABLE 2

| Examples | Q | RB | $M_n$ | $M_w$ | Free resorcinol |
|---|---|---|---|---|---|
| 8 | 36 | 117 | 925 | 1531 | 0.8% |
| 8 (comparative) | 0 | 91 | 698 | 1151 | 2.5% |

Q: quantity of formol used in the reaction (g)
RB: Ring and Ball temperature (° C.)
$M_n$ $M_w$: measured as polystyrene equivalent by steric exclusion chromatography of the resin dissolved in THF

EXAMPLE 9

The synthesis of Example 5 is repeated, increasing the amount of formol from 45 g to 83.7 g.

The resin obtained is fluid and has a dark violet color on transvasing. Its ring and ball temperature is 155° C., with a free resorcinol content of 0.25%. Analysis of the resin dissolved in THF by steric exclusion chromatography gives the following masses: $M_n$=1517, $M_w$=4196.

EXAMPLE 9(COMPARATIVE ACCORDING TO U.S. Pat. No. 4,889,891)

The synthesis of Comparative Example 5a is repeated, increasing the amount of Elform from 40.9 g to 76 g. The resin obtained has a viscosity such that it cannot be transvased from the reactor. The process disclosed in U.S. Pat. No. 4,889,891 cannot be used for the composition of the resin of Example 9.

The invention claimed is:

1. A process for preparing novolac resins, wherein said process comprises a step of coupling at least one aromatic compound (A) comprising at least two hydroxyl groups and at least one aldehyde (B) in the presence of an acid catalyst and in the presence of water, an organic solvent, or both, followed by a step of alkylating the coupling resin thus obtained with at least one unconjugated diene (C), wherein said unconjugated diene does not contain indene.

2. The process of claim 1, wherein the acid catalyst comprises hydrochloric acid, phosphoric acid, sulphuric acid, acetic acid, alkylsulphonic acid, arylsulphonic acid, alkylarylsulphonic acid, phenolsulphonic acid, aklylphenolsulphonic acid, aryldisulphonic acid, or mixtures thereof, or $BF_3$ in gaseous form or in the form of complexes with a phenol and alcohols.

3. The process of claim 1, wherein the solvent comprises alcohols, aromatic hydrocarbons, aliphatic hydrocarbons, ethers, or mixtures thereof.

4. The process according to claim 1, wherein:
(a) the aldehyde (B) is introduced:
(i) either at the same time as the aromatic compound (A) and with the catalyst being introduced subsequently at a temperature such that the reaction medium is homogeneous between 20° C. and 100° C., or
(ii) by adding it after introducing the acid catalyst at a temperature such that the reaction medium is homogeneous between 20° C. and 110° C.; and
(b) the alkylation of The resin obtained from the coupling of the aromatic compound (A) and the aldehyde (B) is carried out by adding the unconjugated diene (C); and
wherein the reaction medium is then maintained at a steady temperature of between 130° C. and 150° C., after which the resin is recovered.

5. The process of claim 1, wherein the aromatic compound (A) comprises monoaromatic compounds such as resorcinol, pyrocatechol, hydroquinone, pyrogallol and phoroglucinol, polyaromatic compounds of formula:

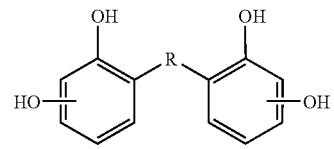

in which R represents an alkylene or arylalkylene radical containing 1 to 12 carbon atoms, or combinations thereof.

6. The process of claim 1, wherein the aromatic compound (A) contains up to 25 mol% of at least one other substituted or unsubstituted phenol.

7. The process of claim 1, wherein the aldehyde (B) comprises formaldehyde, paraformaldehyde, aceraldehyde, propionaldehyde, isobutyraldehyde, n-butyraldehyde, crotonaldehyde, benzaldehyde, furfural, glyoxal, or a mixture thereof, and wherein the [aldehyde(s)]/[aromatic compound(s)] (B)/(A) molar ratio is between 0.05 and 1.

8. The process of claim 1, wherein the unconjugated diene (C) comprises the adducts obrained by Diels-Alder reaction starting with at least two conjugated dienes, oligomers or co-oligomers of said conjugated dienes, or a combination thereof, wherein said oligomers and co-oligomers comprise from 8 to 25 carbon atoms.

9. The process of claim 1, wherein the [unconjugated diene(s)]/[aromatic compound(s)] [C]/[A] molar ratio ranges from 0.2 to 2.

10. The process of claim 3, wherein said alcohols comprise methanol, ethanol, isopropanol, butanol, or mixtures thereof.

11. The process of claim 3, wherein said aromatic hydrocarbons comprise toluene, xylene, ethylbenzene, cumene, aromatic hydrocarbon fractions with a boiling point of less than 220° C., or mixtures thereof.

12. The process of claim 3, wherein said aliphatic hydrocarbons comprise hexane, heptane, or mixtures thereof.

13. The process of claim 3, wherein said ethers comprise terrahydrofuran.

14. The process of claim 4, wherein the aldehyde (B) is introduced at the same time as the aromatic compound (A) and wherein the aldehyde (B) is introduced into the bottom of the reactor.

15. The process of claim 4, wherein the aldehyde (B) is introduced at the same time as the aromatic compound (A) and with the catalyst being introduced subsequently at a temperature such that the reaction medium is homogeneous between 50° C. and 80° C.

16. The process of claim 4, wherein the aldehyde (B) is introduced by adding it after introducing the acid catalyst at a temperature such that the reaction medium is homogeneous between 40° C. and 100° C.

17. The process of claim 4, wherein the alkylation of the resin obtained from the coupling of the aromatic compound (A) and the aldehyde (B) is carried out by adding the unconjugated diene (C) over a period ranging from 5 minutes to 3 hours.

18. The process of claim 17, wherein the alkylation of the resin obtained from the coupling of the aromatic compound (A) and the aldehyde (B) is carried our by adding the unconjugated diene (C) over a period ranging from 5 minutes to 3 hours at a temperature between 100° C. and 160° C.

19. The process of claim 4, wherein the resin is recovered after a distillation step.

20. The process of claim 4, wherein the resin is recovered under vacuum.

21. The process of claim 20, wherein the resin is recovered under vacuum between 4 kPa and 12 kPa, and at a temperature of between 180° C. and 230° C.

22. The process of claim 21, wherein the temperature is between 200° C. and 220° C.

23. The process of claim 5, wherein said monoaromatic compounds comprise resorcinol, pyrocatechol, hydroquinone, pyrogallol, phoroglucinol, or a combination thereof.

24. The process of claim 5, wherein the aromatic compound (A) comprises resorcinol.

25. The process of claim 6, wherein said substituted or unsubstituted phenol comprises alkylphenols comprising an alkyl radical containing from 1 to 14 carbon atoms.

26. The process of claim 6, wherein said substituted or unsubstituted phenol comprises catechu oil.

27. The process of claim 1, wherein the aldehyde (B) comprises formaldehyde, formol, or a mixture thereof and wherein the [aldehyde(s)]/[aromatic compound(s)] (B)/(A) molar ratio is between 0.05 and 1.

28. The process of claim 8, wherein said conjugated diene comprises butadiene, isoprene, piperylene, cyclopentadiene and methylcyclopentadiene, dimethyldicyclopentadiene, dipentene, norbornadiene, or a combination thereof.

29. The process of claim 8, wherein said oligomers and co-oligomers further comprise oligomers or co-oligomers of unconjugated dienes.

30. The process of claim 8, wherein said unconjugated diene (C) further comprises dienes comprising from 75% to 100% by weight of at least one dimer and 0% to 25% by weight of at least one other dimer, co-dimer, or trimer.

31. The process of claim 30, where said at least one dimer comprises dicyclopentadiene.

32. The process of claim 30, wherein said unconjugated diene (C) comprises 75% by weight of dicyclopentadiene and 25% by weight of at least one co-dimer.

33. The process of claim 32, wherein said at least one co-dimer comprises cyclopentadiene-piperylene, cyclopentadiene-isoprene, cyclopentadiene-methylcyclopentadiene, or a combination thereof.

34. The process of claim 8, wherein said unconjugated diene (C) further comprises up to 25mol % of at least one compound comprising aliphatic olefin, branched olefin, or a combination thereof; wherein said branched olefin comprises a $C_6$–$C_{14}$ alkyl, aryl or alkyl aryl radical.

35. The process of claim 34, wherein said aliphatic olefin comprises diisobutylene, isobutylene, amylene, or a combination thereof.

36. The process of claim 34, wherein said branched olefin comprises styrene, α-methylstyrene, vinyltoluene, or a combination thereof.

37. The process of claim 9, wherein said molar ratio is between 0.8 and 1.8.

* * * * *